(12) United States Patent
Vaidyanathan et al.

(10) Patent No.: US 9,405,531 B2
(45) Date of Patent: Aug. 2, 2016

(54) METHODS FOR BUILDING APPLICATION INTELLIGENCE INTO EVENT DRIVEN APPLICATIONS THROUGH USAGE LEARNING, AND SYSTEMS SUPPORTING SUCH APPLICATIONS

(71) Applicant: Software AG, Darmstadt (DE)

(72) Inventors: Praveen Kumar Vaidyanathan, Chennai (IN); Malligarjunan Sidduraj, Chennai (IN); Gary Woods, Seeheim (DE)

(73) Assignee: SOFTWARE AG, Darmstadt (DE)

( * ) Notice: Subject to any disclaimer, the term of this patent is extended or adjusted under 35 U.S.C. 154(b) by 146 days.

(21) Appl. No.: 13/945,410

(22) Filed: Jul. 18, 2013

(65) Prior Publication Data

US 2015/0026660 A1 Jan. 22, 2015

(30) Foreign Application Priority Data

Jul. 16, 2013 (IN) .............................. 846/KOL/2013

(51) Int. Cl.
*G06F 9/45* (2006.01)
*G06F 9/44* (2006.01)
*G06Q 10/06* (2012.01)

(52) U.S. Cl.
CPC .............. *G06F 8/70* (2013.01); *G06Q 10/0633* (2013.01); *G06F 8/443* (2013.01); *G06F 2201/865* (2013.01)

(58) Field of Classification Search
None
See application file for complete search history.

(56) References Cited

U.S. PATENT DOCUMENTS

| | | | |
|---|---|---|---|
| 4,910,660 A * | 3/1990 | Li ................................... | 700/47 |
| 5,079,690 A * | 1/1992 | Li ................................... | 700/48 |
| 6,226,627 B1 * | 5/2001 | Polak .............................. | 706/14 |
| 6,236,994 B1 * | 5/2001 | Swartz et al. .................. | 707/635 |
| 6,415,259 B1 * | 7/2002 | Wolfinger et al. ............ | 705/7.13 |
| 6,959,265 B1 * | 10/2005 | Candela .............. | G06F 11/3409 370/254 |
| 7,653,633 B2 | 1/2010 | Villella et al. | |
| 7,908,391 B1 * | 3/2011 | Satish et al. ................... | 709/232 |
| 8,156,481 B1 * | 4/2012 | Koh et al. ...................... | 717/151 |
| 8,204,861 B2 | 6/2012 | Sondhi et al. | |

(Continued)

OTHER PUBLICATIONS

Michael Adams , "Dynamic Workflow" , Springer-Verlag , 2010 , <http://www.springer.com/cda/content/document/cda__download-document/9783642031205-c2.pdf> , pp. 1-24.*

(Continued)

*Primary Examiner* — Thuy Dao
*Assistant Examiner* — Samuel Hayim
(74) *Attorney, Agent, or Firm* — Nixon & Vanderhye PC

(57) ABSTRACT

Certain example embodiments relate to application intelligence gathering systems and/or methods, e.g., in connection with Event Driven Applications and/or the like. More particularly, certain example embodiments relate to the effective recording of application evolution and usage information for usage learning and/or event auditing purposes. With respect to usage learning, certain example embodiments may help to capture data on the usage patterns and/or apply learning algorithms that work on the captured data to provide required intelligence to the application. With respect to event auditing, certain example embodiments may help to identify the "who", "what", "when", "where", "how", and/or "why" of particular operations. Application intelligence optionally may be used in determining application "hotspots" or commonly used features that could help in areas such as application maintenance, performance tuning, and/or the like.

26 Claims, 9 Drawing Sheets

(56) References Cited

U.S. PATENT DOCUMENTS

| | | | |
|---|---|---|---|
| 8,271,899 B1 | 9/2012 | Blackburn et al. | |
| 2002/0194393 A1* | 12/2002 | Hrischuk et al. | 709/318 |
| 2003/0139917 A1* | 7/2003 | Hardwick | G06F 11/3414 703/21 |
| 2003/0229524 A1* | 12/2003 | Reuveni | G06F 11/3409 705/7.11 |
| 2004/0025162 A1* | 2/2004 | Fisk | G06F 3/0613 718/105 |
| 2004/0220947 A1* | 11/2004 | Aman | G06F 11/3433 |
| 2005/0114849 A1* | 5/2005 | Megiddo | 717/151 |
| 2005/0165935 A1* | 7/2005 | Moody | G06F 11/302 709/228 |
| 2005/0166207 A1* | 7/2005 | Baba et al. | 718/105 |
| 2005/0172018 A1* | 8/2005 | Devine | G06F 11/0709 709/223 |
| 2005/0235267 A1* | 10/2005 | McClard | G06F 11/3476 717/127 |
| 2006/0053421 A1* | 3/2006 | Dickenson | 718/100 |
| 2007/0016672 A1* | 1/2007 | Wilson et al. | 709/224 |
| 2007/0067373 A1* | 3/2007 | Higgins et al. | 707/206 |
| 2007/0209010 A1* | 9/2007 | West | G06F 11/3414 715/762 |
| 2009/0307670 A1* | 12/2009 | Kashyap et al. | 717/135 |
| 2011/0225565 A1* | 9/2011 | van Velzen et al. | 717/114 |
| 2011/0296057 A1* | 12/2011 | Shah et al. | 710/14 |
| 2012/0060142 A1* | 3/2012 | Fliess et al. | 717/102 |
| 2012/0117574 A1* | 5/2012 | Yu et al. | 719/316 |
| 2013/0104041 A1 | 4/2013 | Seshagiri et al. | |
| 2013/0219057 A1* | 8/2013 | Li et al. | 709/224 |
| 2013/0254754 A1* | 9/2013 | Rajaraman | 717/149 |

OTHER PUBLICATIONS

Roman Bartak et al., "Workflow Optimization with FlowOpt", IEEE, 2011, <http://ieeexplore.ieee.org/stamp/stamp.jsp?tp=&arnumber=6120738>, pp. 1-6.*

Ling Ling Zang, "Implement Optimized Workflow Solution on HPC Platform", ACM, 2007, <http://delivery.acm.org/10.1145/1380000/1375802/p74-zhang.pdf>, pp. 1-6.*

Software AG—What is an Event-Driven Appliation? [retrieved Jul. 18, 2013]. http://documentation.softwareag.com/natural/nat638win/pg/pg_ev_what_is_an_eda.htm.

Wikipedia—Event Driven Programming [retrieved Jul. 18, 2013]. http://en.wikipedia.org/wiki/Event-driven_programming.

Wikipedia—Finite-State Machine [retrieved Jul. 18, 2013]. http://en.wikipedia.org/wiki/Finite-state_machine.

* cited by examiner

| States | Decision Data Set | | | Input Data Processing | Inference |
|---|---|---|---|---|---|
| | Data | Type | Value | | |
| Balance Enquiry *(Event Type = Manual)* *(Action Type = Information Solicitation)* | Bal. | long | 5500 | No Input | 1. Mandatory Step 2. Balance Enquiry *after* Authentication |
| No Print *(Event Type = Manual)* *(Action Type = Actionable)* | Bal. | long | 5500 | No Input | 1. Optional Step |
| Withdrawal *(Event Type = Manual)* *(Action Type = Assertion)* | Bal. Amt. | long long | 5500 2000 | Data :2000 Type : long 1.getAllValuesFromDataSet(type=long) 2. {5500} 3. Long Operation Results a. Greater (input>data) = false b. Lesser (input<data) = true c. Equals (input == data) = false | 1. Mandatory Step 2. Cash withdrawal after *Balance Enquiry* 3. Amount input < Balance |
| Choose Denomination *(Event Type = Automatic)* *(Action Type = Actionable)* | | | | | 1. Optional Step |
| No Print *(Event Type = Manual)* *(Action Type = Actionable)* | Bal. Amt. | long long | 5500 2000 | No Input | 1. Optional Step |
| Balance Enquiry *(Event Type = Manual)* *(Action Type = Information Solicitation)* | Bal. Amt. Bal. | long long long | 5500 2000 3500 | No Input | 1.Mandatory Step 2. Balance Enquiry *after* Cash withdrawal |
| Print *(Event Type = Manual)* *(Action Type = Assertion)* | Bal. Amt. Bal. Print | long long long Balance | 5500 2000 3500 Balance | Data : Balance Type : Balance 1.getAllValuesFromDataSet(type=Balance) 2. {} | 1. Mandatory Step 2. Print *after* Balance Enquiry |

Fig. 4

| States | Decision Data Set | | | Input Data Processing | Inference |
|---|---|---|---|---|---|
| | Data | Type | Value | | |
| Balance Enquiry *(Event Type = Manual)* *(Action Type = Information Solicitation)* | Bal. | long | 3500 | No Input | 1. Mandatory Step 2. Balance Enquiry *after* Authentication |
| No Print *(Event Type = Manual)* *(Action Type = Actionable)* | Bal. | long | 3500 | No Input | 1. Optional Step |
| Withdrawal *(Event Type = Manual)* *(Action Type = Assertion)* | Bal. Amt. | long long | 3500 2000 | Data :2000 Type : long 1. getAllValuesFromDataSet(type=long) 2. {3500} 3. Long Operation Results a. Greater (input>data) = false b. Lesser (input<data) = true c. Equals (input == data) = false | 1. Mandatory Step 2. Cash withdrawal after *Balance Enquiry* 3. *Amount input < Balance* |
| Choose Denomination *(Event Type = Automatic)* *(Action Type = Actionable)* | | | | | 1. Optional Step |
| No Print *(Event Type = Manual)* *(Action Type = Actionable)* | Bal. Amt. | long long | 3500 2000 | No Input | 1. Optional Step |
| Exit | | | | | |

Fig. 5

| States | Decision Data Set | | | Input Data Processing | Inference |
|---|---|---|---|---|---|
| | Data | Type | Value | | |
| Balance Enquiry (Event Type = Manual) (Action Type = Information Solicitation) | Bal. | long | 1500 | No Input | 1. Mandatory Step 2. Balance Enquiry *after* Authentication |
| No Print (Event Type = Manual) (Action Type = Actionable) | Bal. | long | 1500 | No Input | 1. Optional Step |
| Withdrawal (Event Type = Manual) (Action Type = Assertion) | Bal. Amt. | long long | 1500 1000 | Data : 1000 Type : long 1. getAllValuesFromDataSet(type=long) 2. {1500} 3. Long Operation Results a. Greater (input>data) = false b. Lesser (input<data) = true c. Equals (input == data) = false | 1. Mandatory Step 2. Cash withdrawal after *Balance Enquiry* 3. *Amount input < Balance* |
| Choose Denomination (Event Type = Automatic) (Action Type = Actionable) | | | | | 1. Optional Step |
| No Print (Event Type = Manual) (Action Type = Actionable) | Bal. Amt. | long long | 1500 1000 | No Input | 1. Optional Step |
| Balance Enquiry (Event Type = Manual) (Action Type = Information Solicitation) | Bal. Amt. Bal. | long long long | 1500 1000 500 | No Input | 1. Mandatory Step 2. Balance Enquiry *after* Cash withdrawal |
| Print (Event Type = Manual) (Action Type = Assertion) | Bal. Amt. Bal. Print | long long long Balance | 1500 1000 500 Balance | Data : Balance Type : Balance 1. getAllValuesFromDataSet(type=Balance) 2. {} | 1. Mandatory Step 2. Print *after* Balance Enquiry |

Fig. 6

METHODS FOR BUILDING APPLICATION INTELLIGENCE INTO EVENT DRIVEN APPLICATIONS THROUGH USAGE LEARNING, AND SYSTEMS SUPPORTING SUCH APPLICATIONS

CROSS-REFERENCE TO PRIORITY APPLICATION

This application claims priority to Indian patent application no. 846/KOL/2013, filed on 16 Jul. 2013, the entire contents of which are herein incorporated herein by reference.

TECHNICAL FIELD

Certain example embodiments described herein relate to techniques for leveraging application intelligence. More particularly, certain example embodiments described herein relate to gathering information about an application, e.g., to generate interaction patterns that may help to identify data relevant to decision-making, reason about a user's intended actions, generate inference documents that capture the user's intentions, etc. Certain example embodiments additionally or alternatively apply a "who", "what", "when", "where", "how", and/or "why" approach to event auditing.

BACKGROUND AND SUMMARY OF EXAMPLE EMBODIMENTS OF THE INVENTION

A simple Event Driven Application is one that responds to actions generated by the user or the system. Event Driven Applications can perform a predetermined sequence of actions depending, for example, on a sequence of actions and/or events with which they are presented. Simple examples of Event Driven Applications include vending machines that dispense products when the proper combination of coins is deposited, combination locks that require the input of combination numbers in the proper order, etc. Although these examples are simple, it is known that Event Driven Applications can model a large number of potentially complex problems such as, for example, electronic design automation, communication protocol design, language parsing, engineering applications, and/or the like.

It will be appreciated that in a good Service-Oriented Architecture (SOA) Governance solution, the careful development of services/applications may help to determine the value it adds to the business. Unfortunately, however, the development and evolution of the services are determined by a series of lifecycle states and events that are difficult to track and/or monitor, thus making it difficult to provide useful information to application/service developers and/or other interested stakeholders.

For example, recording of the evolution of applications and what happens as such applications go through multiple states/events during development and as they are used when actually deployed, can impose potentially significant requirements, e.g., when it comes to gathering data relevant to analyzing and understanding the important design decisions made throughout its evolution, as well as for application maintenance and anomaly resolution during development and deployed use.

The inventors have also realized that additional or alternative benefits could be derived from careful recording of the interactions with the aforementioned applications, e.g., based on observed and/or adduced interaction patterns. Interaction patterns can, for example, be studied to build intelligent applications that can automatically or at least semi-automatically determine new application workflows based on previous interactions that it had with the particular user. Examples of such changed flows may include, for example, dynamically changing a GUI according to analysis of human interaction patterns. Building a dynamic system, e.g., where less frequently used parts of an application filtered and user-preferred flows are at least initially shown, may reduce the number of "clicks" performed on a GUI and thus may improve the efficiency of the interactions, while creating a more natural feeling and easier to use application. Unfortunately, however, it oftentimes is difficult to gather this information, as well, and it therefore is difficult to enable solutions of these sorts.

Although some current attempts to have been made to use event driven auditing to build "audit logs" or the like, such techniques stop short of actually interpreting those logs to build intelligent systems. And although some tools have been developed for processing audit logs to collect and analyze the events so as to determine further courses of actions (e.g., like raising an alarm in monitoring systems, etc.), such approaches likewise stop short of actually instilling intelligence into applications, e.g., based on the events and logs.

Thus, it will be appreciated by those skilled in the art that it would be desirable to overcome these and/or other problems. For example, it will be appreciated that it would be desirable to build application intelligence on Event Driven Applications by effective recording of application evolution and usage.

One aspect of certain example embodiments relates to effective recording of application evolution and usage for usage learning and/or event auditing purposes. With respect to usage learning, certain example embodiments may help to capture data on the usage patterns and/or apply learning algorithms that work on the captured data to provide required intelligence to the application. With respect to event auditing, certain example embodiments may help to identify the "who", "what", "when", "where", "how", and/or "why" of particular operations, e.g., to respectively identify for a given operation or combination of operations the user who is performing the particular operation on the application; what operation is being performed by the user on the application; the time at which the operation is being performed; the physical location at which the operation is performed; how the operation is performed (e.g., manually, automatically, some combination thereof, etc.); and the reason(s) behind the operation.

Another aspect of certain example embodiments relates to using application intelligence to determine application "hotspots" or commonly used features (including those that are most common) that help in areas such as application maintenance, performance tuning, and/or the like.

Another aspect of certain example embodiments relates to using application intelligence to equip an application with knowledge about different users' usage patterns, e.g., so that the application can present different workflows tailored for different users for the same application.

In certain example embodiments, an application intelligence gathering method for use with an application hosted by a computer system is provided. Artifacts are received from a computer readable storage medium, with the artifacts representing data gathered during execution of the application and relating to events that occur during the execution. Using a computer processor, interaction patterns associated with the events are identified. Inference documents are generated in connection with the identified interaction patterns using the computer processor. The inference documents include, for each said event, an indication as to whether that event is mandatory or optional and one or more reasoned statements concerning the user's intentions for that event. Using the computer processor, at least one custom application workflow is generated based on the generated inference documents. The at least one custom application is transformable into a new application workflow that is deployable into the application.

In certain example embodiments, there is provided a non-transitory computer readable storage medium tangibly storing instructions that, when performed, gather application intelligence on an application hosted by a computer system, by executing instructions to at least: receive artifacts from a computer readable storage medium, the artifacts representing data gathered during execution of the application and relating to events that occur during the execution; identify interaction patterns associated with the events; generate inference documents in connection with the identified interaction patterns, the inference documents including, for each said event, an indication as to whether that event is mandatory or optional and one or more reasoned statements concerning the user's intentions for that event; and generate at least one custom application workflow based on the generated inference documents, the at least one custom application workflow being different from default application workflows. The at least one custom application is transformable into a new application workflow that is deployable into the application.

In certain example embodiments, a computer system for gathering application intelligence on an application is provided. Processing resources include at least one processor and a memory. A computer readable storage medium tangibly stores data gathered during execution of the application and relating to events that occur during the execution. At least some of the processing resources are configured to at least: identify interaction patterns associated with the events, using the computer readable storage medium; generate inference documents in connection with the identified interaction patterns, the inference documents including, for each said event, an indication as to whether that event is mandatory or optional and one or more reasoned statements concerning the user's intentions for that event; and generate at least one custom application workflow based on the generated inference documents, the at least one custom application workflow potentially being different from default application workflows. The at least one custom application is transformable into a new application workflow that is deployable into the application. The data gathered during execution of the application indicates, for each said event, what kind of event was performed, why the event happened, who was responsible for triggering the event, when the event happened, where the event happened, and how the event was triggered, as appropriate for the respective event.

These features, aspects, advantages, and example embodiments may be used separately and/or applied in various combinations and sub-combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIGS. 4-6 are tables that help explain how inference documents in accordance with certain example embodiments may be generated for the ATM example discussed herein;

DETAILED DESCRIPTION OF EXAMPLE EMBODIMENTS OF THE INVENTION

Certain example embodiments relate to use effective logging as a means for building application intelligence into systems. As explained in greater detail below, interaction patterns may be analyzed and/or inference documents may be generated, e.g., to aid in identifying data that helps in decision-making and to reason about a user's intended actions, and to build self-evolving systems, respectively. In certain example embodiments, heat maps may be generated to determine "hotspots" (e.g., within a critical path) in the system that can be performance-tuned when applying changes. Heat maps additionally or alternatively can be generated to facilitate the development of custom workflows and primary step identification to determine critical paths for testing changes to a system.

Certain example embodiments work on the principle that, in a computer interaction, a next set of actions undertaken by a human user and/or the computer system itself generally will be based at least in part on the interactions that happened in the previous step(s) and data collected from the previous step(s). This relationship implies that the data is key to the decision-making In a related vein, certain example embodiments provide systems and/or methods that have the ability to reason about and/or understand the user's actions in the current state in relation to the "decision data" collected from one or more previous steps and thus can infer the rationale behind such actions. This ability of certain example embodiments helps to drive the learning that enables applications and/or their systems to evolve on their own.

Figure 1:
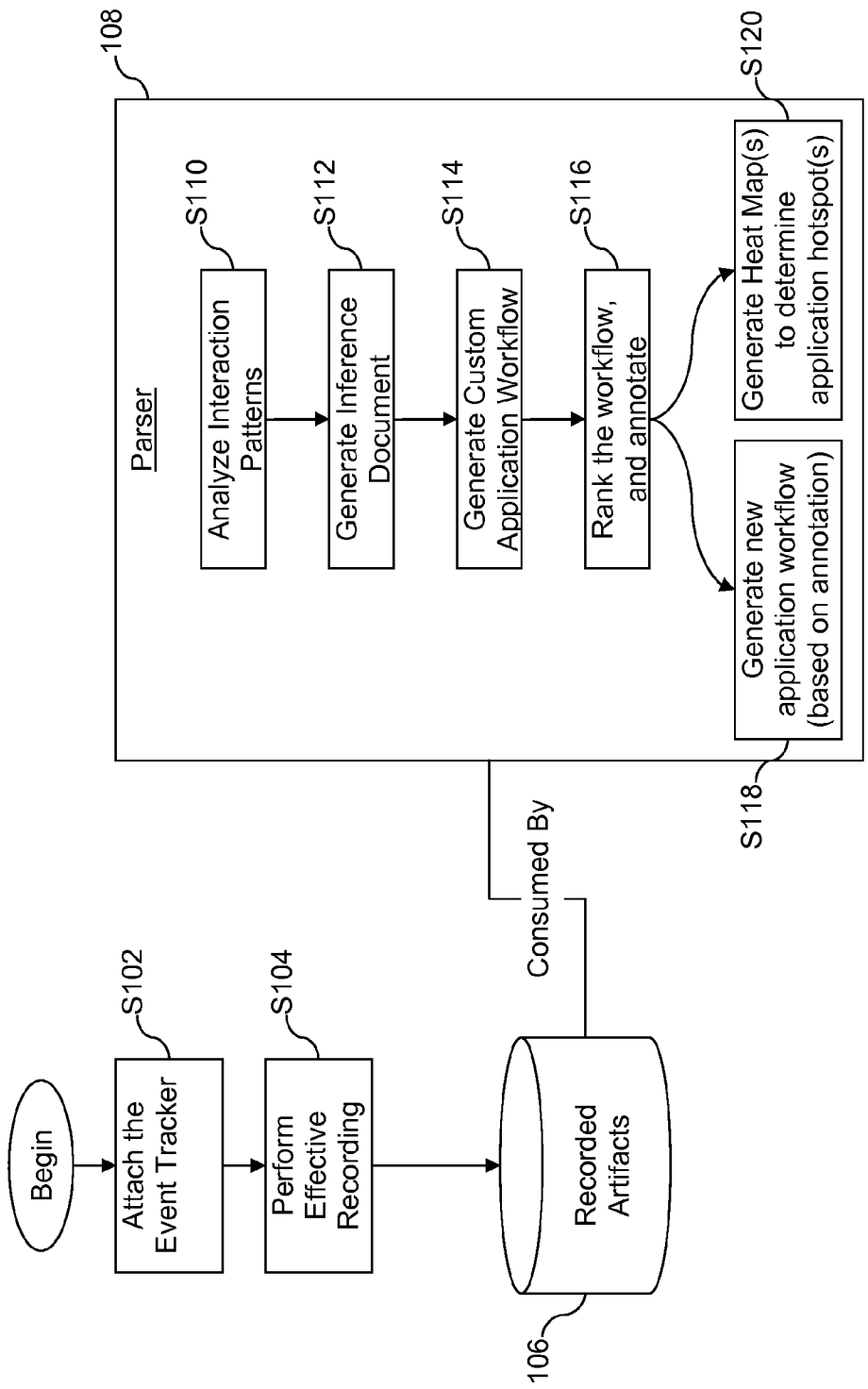
FIG. 1 provides a high-level overview of an approach for usage learning that may be used in connection with certain example embodiments.

Referring now more particularly to the drawings, FIG. 1 provides a high-level overview of an approach for usage learning that may be used in connection with certain example embodiments. Because Event Driven Applications perform a predetermined sequence of actions depending on a sequence of actions/events they are presented with, an Event Tracker can be built into such systems in step S102. The Event Tracker preferably is configured to effectively record events that happen in the system, e.g., in step S104. The recording may include capturing event transition data indicating, for example, what kind of event was performed, why it happened, who was responsible for triggering the event, when the event happened, where it happened, how the event was triggered, and/or the like. An Event Tracker in certain example embodiments may act as a listener to all the events that happen in the system. For example, a Balance Enquiry action (discussed in greater detail below) is performed on the system by a user, and this triggers an event in the system. At this point, the tracker will receive this event and along with the knowledge on the current state of the system, it will deduce the information on the what (Balance Enquiry), when (event trigger time), who (current user), how (manual and/or automatic transition from earlier state), why (deducible in further steps of parsing), etc., of the event. Also at the initial stages of parsing, events' relationships may be derived based (potentially solely) on the combination of the user actions and the time at which the action is performed, in some example instances. At later stages in parsing, an event relationship may be deduced based on the algorithms discussed later on in this disclosure (e.g., a user intended to perform a Balance Enquiry before a cash withdrawal in the ATM example below).

When events are captured, annotations can be added, e.g., to identify general transitions (e.g., common or repeated transitions or workflows), to associate comments with the events and/or event transition data, etc. For example, annotations can be added to identify the user's common workflows (e.g., preferred workflows) in certain example embodiments. These annotated workflows can also be presented to the user as "favorites." Example annotations vis-à-vis the ATM example provided below may include, for example, Cash_Withdrawal_2000_With_PrintBalance and Cash_Withdrawal_With_PrintBalance. In addition to the workflows, logical groups (e.g., like 1000_Withdrawl (e.g., an action that involves Selecting Cash Withdrawl->Select Denomination->Confirmation) explained in greater detail below) can also be annotated for reuse, which can be directly integrated into custom generated workflows. The artifacts may be stored to a suitable storage location 106 (e.g., a non-transitory computer readable storage medium that is local to the system, accessible over the network, etc.). Any annotations also can be stored to the storage location 106, and the artifacts may be associated with annotations, when and as appropriate.

With the "Recorded Artifacts" in the storage location 106, the parser 108 will analyze these recordings to identify the interaction patterns between the user and the system in step S110, e.g., in cooperation with processing resources such as a processor and a memory. The interaction patterns analysis process my help to form logical groupings of sequences of events. These groupings may be based on parameters such as, for example, why the event was triggered, when it happened, and/or the like. Additional or alternative parameters outside of the "who", "what", "when", "where", "how", and/or "why" paradigm may be used, in certain example embodiments.

Inference documents may be generated in step S112, e.g., to help capture the "intentions" behind the user's actions in each and every state in an application workflow. Using the interference documents, the parser 108 may generate a draft workflow of the recorded scenario in step S114, with these logical groupings being the steps/states in the workflow. This workflow will then be annotated to generalize the transactions. The resulting annotated workflow may be thought or as representing the "User Preferred" application flow. When multiple workflows are generated, they may be ranked and annotated in step S116.

When a certain threshold is met (e.g., when a given workflow is generated a predetermined number of times for the same or different users, etc.) and optionally when manually approved, a new application workflow may be generated and optionally deployed into the application in step S118. The custom workflows can also be used to determine the application hotspots in the system in step S120 and, as alluded to above, these hotspots and their related heat maps that can help in application maintenance and/or performance tuning

EXAMPLE IMPLEMENTATION

The following sections help elaborate on the description provided above in connection with FIG. 1, using an illustrative ATM system example. That is, the following ATM system example shown in and discussed in connection with FIG. 2 helps to explain the process of generating customized workflows and autobiographies. Of course, it will be appreciated that the example techniques described herein have applicability to other Event Driven Applications outside of the ATM and banking contexts and, thus, this example implementation is provided for explanatory purposes and without limitation on the scope of what ultimately is claimed.

Figure 2:
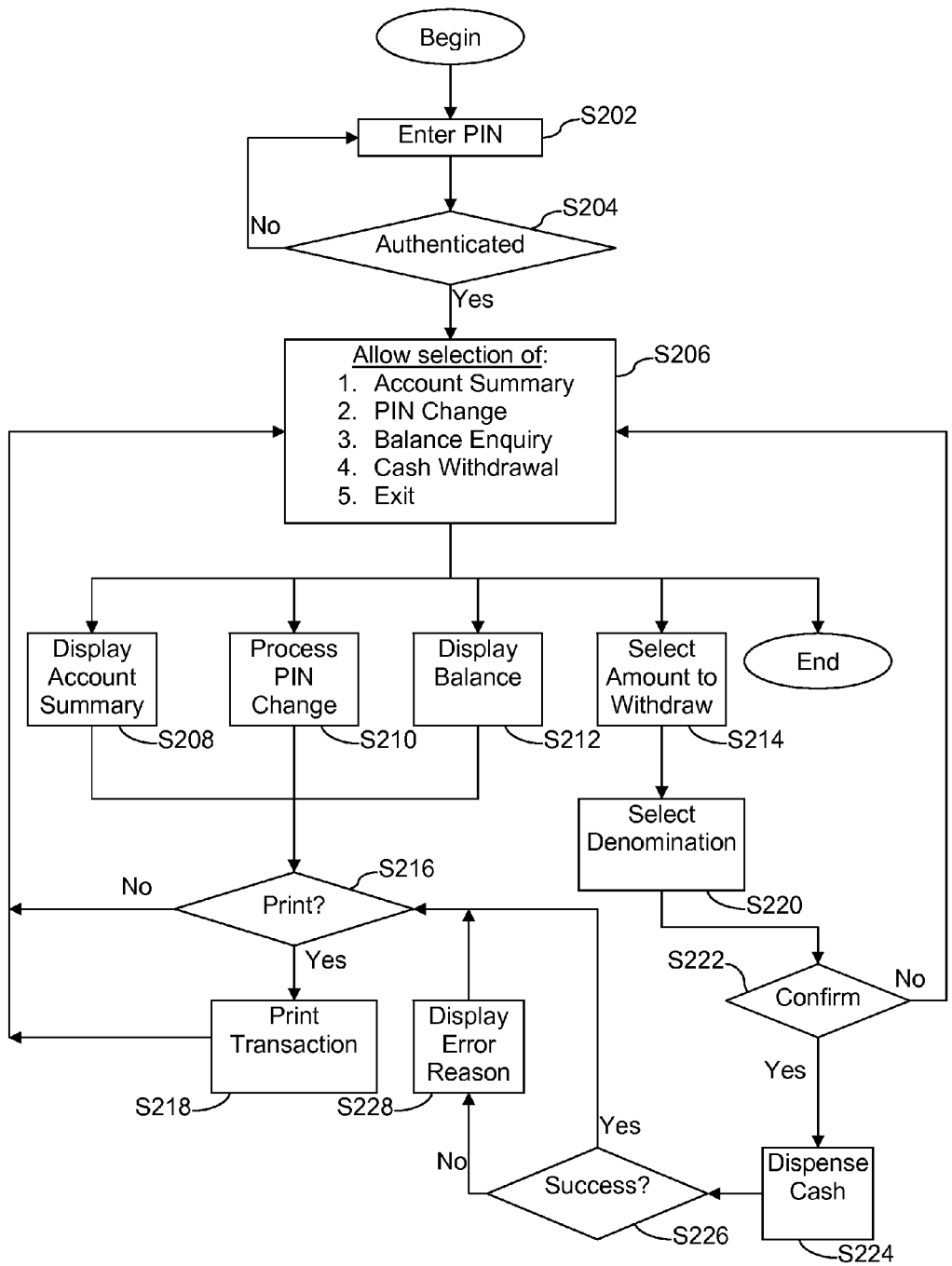
FIG. 2 is an ATM system example that is used to illustrate the techniques of certain example embodiments.

As indicated above, FIG. 2 is an ATM system example that is used to illustrate the techniques of certain example embodiments, and a brief description of the familiar process will now be provided. In step S202 of FIG. 2, a personal identification number or PIN is entered by a user (e.g., after a credit card, debit card, or the like is inserted into the ATM). An attempt is made to authenticate the PIN and, if the authentication fails as determined in step S204, the process returns to step S202 so that a PIN can be re-entered. Otherwise, the user is presented with a menu screen in S206, allowing the user to select options for displaying an account summary, processing a PIN change, displaying an account balance, initiating a withdrawal, and exiting the session. Based on the selection, the appropriate screens are displayed and further actions from the user may be received. In response to one of the account summary being displayed in step S208, a PIN change being processed in step S210, and/or a balance being displayed in step S212, the user is presented with an option to print a receipt or the like. If a determination is made in step S216 that no receipt should be printed, then the process returns to the main menu. Otherwise, a record of the transaction is printed in step S218 and then the process returns to the main menu. If the user instead selects an amount to withdraw via step S214, the denomination of the cash to be dispensed may be specified or automatically calculated in step S220. The user may be presented with an option to confirm the withdrawal and/or denomination request and, if it is determined in step S222 that the request should be aborted, then the process returns to the main menu. On the other hand, if it is determined in step S222 that the request should be processed, then an attempt to dispense the cash is made in step S224. If there are no problems with the dispensing of the cash (e.g., as determined in step S226), the user has the option to print a record of the transaction (e.g., as described above) and return to the main menu. On the other hand, if a problem is encountered with the dispensing of the cash (e.g., as determined in step S226), the reason for the error (e.g., insufficient funds in the account, insufficient funds or incorrect denominations in the ATM, etc.) is displayed in step S228. As above, the user has the option to print a record of the failed transaction (e.g., as described above) and return to the main menu.

Having described the initial FIG. 2 example in detail, further detail concerning how the FIG. 1 approach may operate in certain example instances will now be provided.

Generating Effective Recordings

As discussed above, the effective recording attempts to log possible interactions (e.g., each and every possible interaction) between the user and the application. This may involve capturing event transition data that answers questions such as, for example, "What kind of event was performed", "Why did it happen", "Who is responsible for triggering the event", "When did the event happen", "Where did it happen", "What data was passed between the user and the system", "How was the event triggered", etc.

Assume for the purposes of this ATM example that a customer named John goes to the ATM and withdraws money on the 1st, 11th, and 21st of Jan. 2013. Each of these transactions may be slightly different from the earlier ones. Assume further that each transaction is performed in accordance with the illustrative scenarios in Table 1, below:

TABLE 1

Illustrative ATM Withdrawal Scenarios

| 1 January 2013 | 11 January 2013 | 21 January 2013 |
|---|---|---|
| In this case, John wants to withdraw $2,000. He wants to ensure that he has a balance sufficient to perform the withdrawal. Thus, he checks the balance first and finds that there is a sufficient balance. He does not print the balance, as he only intended to know it. Now that he knows that there is a sufficient balance, John decides to withdraw $2,000. The system chooses the denomination automatically and dispenses the cash. Now, John wants to confirm that the remaining balance of $5,500 is intact. John initiates a balance enquiry and prints a receipt for future reference. | In this case, John wants to withdraw $2,000. He wants to ensure that he has a balance sufficient to perform the withdrawal. Thus, he checks the balance first and finds that there is a sufficient balance. He does not print the balance, as he only intended to know it. Now that he knows that there is a sufficient balance, John decides to withdraw $2,000. The system chooses the denomination automatically and dispenses the cash. John does not intend to check the balance, and he simply exits the ATM session. | In this case, John wants to withdraw $2,000. He wants to ensure that he has a balance sufficient to perform the withdrawal. Thus, he checks the balance first and finds that there is a shortage in the balance, he decides to withdraw $1,000 instead of $2,000. The system chooses the denomination automatically and dispenses the cash. Now, John wants to confirm that the remaining balance of $500 is intact. John initiates a balance enquiry and prints a receipt for future reference. |

Tables 2-4 below respectively show the details recorded for the three transactions.

TABLE 2

Example Record Details for 1 January 2013 Illustrative Scenario

| Who | What | When | How | Data Log | Method |
|---|---|---|---|---|---|
| John | LoggedIn | 2013-01-01 10:30:24 am | Manual | START_OF_EVENT | login(string:user, string pwd) : Boolean |
| John | Check Balance | 2013-01-01 10:30:29 am | Manual | BalanceAmount: 5500 | displayBalance( ) : long |
| John | Withdraw | 2013-01-01 10:30:37 am | Manual | $2000 | withdraw(long:amount) |
| John | Choose Denomination | 2013-01-01 10:30:38 am | Auto. | 100 * 14 + 50 * 12 | findDenomination( ) : Map<long, long> |
| John | Withdraw cash | 2013-01-01 10:30:51 am | Auto. | | dispenseCash ( ) : long |
| John | Check Balance | 2013-01-01 10:30:57 am | Manual | Balance: 3500 | displayBalance( ) : long |
| John | Print | 2013-01-01 10:30:57 am | Manual | Print | printBalance( ) : long |
| John | Exit | 2013-01-01 10:30:58 am | Manual | END_OF_EVENT | logout( ) |

TABLE 3

Example Record Details for 11 January 2013 Illustrative Scenario

| Who | What | When | How | Data Log | Method |
|---|---|---|---|---|---|
| John | LoggedIn | 2013-01-11 5:30:24 pm | Manual | START_OF_EVENT | login(string:user, string pwd) : Boolean |
| John | Check Balance | 2013-01-11 5:30:29 pm | Manual | BalanceAmount: 3500 | displayBalance( ) : long |
| John | Withdraw | 2013-01-11 5:30:37 pm | Manual | $2000 | withdraw(long:amount) |
| John | Choose Denomination | 2013-01-11 5:30:38 pm | Auto. | 100 * 14 + 50 * 12 | findDenomination( ) : Map<long, long> |
| John | Withdraw cash | 2013-01-11 5:30:51 pm | Auto. | | dispenseCash ( ) : long |
| John | Exit | 2013-01-11 5:30:57 pm | Manual | END_OF_EVENT | logout( ) |

TABLE 4

Example Record Details for 21 January 2013 Illustrative Scenario

| Who | What | When | How | Data Log | Method |
|---|---|---|---|---|---|
| John | LoggedIn | 2013-01-21 12:30:24 pm | Manual | START_OF_EVENT | login(string:user, string pwd) : Boolean |

TABLE 4-continued

Example Record Details for 21 January 2013 Illustrative Scenario

| Who | What | When | How | Data Log | Method |
|---|---|---|---|---|---|
| John | Check Balance | 2013-01-21 12:30:29 pm | Manual | BalanceAmount: 1500 | displayBalance( ) : long |
| John | Withdraw | 2013-01-21 12:30:37 pm | Manual | $1000 | withdraw(long:amount) |
| John | Choose Denomination | 2013-01-21 12:30:38 pm | Auto. | 100 * 8 + 50 * 4 | findDenomination( ) : Map<long, long> |
| John | Withdraw cash | 2013-01-21 12:30:51 pm | Auto. | | dispenseCash ( ) : void |
| John | Check Balance | 2013-01-21 12:30:57 pm | Manual | Balance: $500 | displayBalance( ) : void |
| John | Print | 2013-01-21 12:30:57 pm | Manual | Print | printBalance( ) : long |
| John | Exit | 2013-01-21 12:30:58 pm | Manual | END_OF_EVENT | logout( ) |

These records will then be picked up by the parser to analyze interaction patterns.

Analyzing Interaction Patterns

As discussed above, usage learning involves gathering that aids in decision-making Thus, certain example embodiments strive to effectively collect the "critical data" during application/system execution. Execution may in general comprise a set of executable steps, and each executable step may involve an interaction with the user or other system. Thus, it may in some case be useful to understand interaction patterns.

In human-computer interactions, or in two-way conversations in general, the type of interactions could be broadly classified as one party providing information to the other, one party seeking information from the other, and one party asking the other party to perform an action. These interactions may be referred to as assertion patterns, information solicitation, and actionable patterns, respectively.

Certain example embodiments involve combining these interactions in a particular order. For example, a very simple calculator service that helps performing the addition of two integers could be defined as, for example:
int add(int a, int b);
A user invoking this operation essentially asks the system to perform addition (an actionable pattern) by providing two inputs (an assertion) and requests the result (an information solicitation).

The resultant data may then serve any purpose such as, for example, assisting with or even controlling decision-making, providing input to a next set of actions, etc. Thus, it will be appreciated that it would be desirable to analyze interaction patterns based on the recordings and knowledge about the system, e.g., to obtain decision-making related data and reason about an intended action.

Referring once again to the ATM example and the scenarios contemplated above, an analysis of the logs may result in the generation of the following report shown in Table 5, below.

TABLE 5

Interaction Pattern Report

| Method | Interaction Pattern |
|---|---|
| login(string:user, string pwd) | Assertion |
| displayBalance( ) : long | Information Solicitation |
| withdraw(long:amount) | Assertion |
| findDenomination( ) : Map<long, long> | Information Solicitation |
| dispenseCash( ) : void | Actionable |
| printBalance ( ) : long | Information Solicitation |
| logout( ) | Actionable |

This report, along with the recordings, will now be parsed to generate inference documents.

Generating Inference Documents

Inference Documents help capture the intentions behind users' actions in the states in an application workflow. This is done by reasoning about the users' actions in connection with a decision data set. The inference documents may be generated for every single transaction between the user and the system in certain example embodiments.

Figure 3:
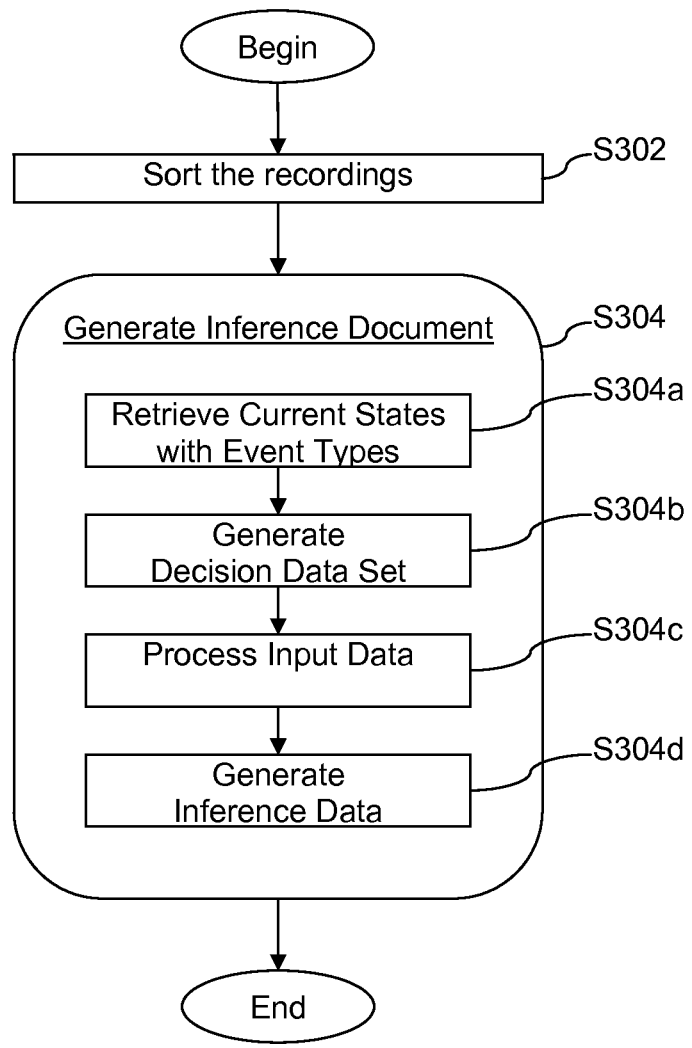
FIG. 3 helps explain how inference documents may be generated, according to certain example embodiments.

FIG. 3 helps explain how inference documents may be generated, according to certain example embodiments. FIG. 3 assumes that the logs discussed above are received and that the interaction patterns have been identified. Thus, in step S302, for each transaction, the recording obtained after analyzing the interactions patterns are sorted based on the time when the event occurred. Once the sorting of the recordings is complete, in step S304, a variety of data may be generated for the states in a transaction. This data may include, for example, (a) data about the current state(s) with associated event types and/or action types, e.g., as obtained from the recordings in step S304a; (b) a decision data set, e.g., generated by collecting the data presented to the user in a state (which may include, for example, data returned by the actions that confirm to the Information Solicitation Pattern) in step S304b; (c) process input data, e.g., generated by processing the decision data to infer the user's intentions behind an action in step S304c; and (d) inference documents, e.g., generated using the above-described and/or other data in step S304d.

The inference document that is generated may include information indicating whether a state/event is mandatory, and the user's intentions behind an action. With respect to the former, an indication that a state/event is mandatory may mean that the user performed the related action because of the application flow and not because the user actually wanted to do so. Reasoning about whether an event/action type is mandatory or optional may be based on the following and/or other rules:

If Event Type is Manual and Decision Data exists→Mandatory
If Event Type is Manual and no Decision Data exists→Optional
If Event Type is Automatic and Decision Data exists→Mandatory
If Event Type is Automatic and no Decision Data exists→Mandatory The tables in FIGS. 4-6 help explain how inference documents in accordance with certain example embodiments may be generated for the ATM example discussed herein. FIGS. 4-6 are for the 1 Jan. 2013, 11 Jan. 2013, and 21 Jan. 2013 transactions, respectively. It is noted that the right-most column lists the inferences that may be drawn, e.g., whether steps seem to be mandatory or optional, the apparent temporal order of steps, conditions placed on certain inputs, etc. These inference documents may help in generating the custom application workflows as described in greater detail below. Although not considered in the example above, in the case of an ATM network, a physical location parameter might also be considered as a factor recorded in the inference document, providing an additional input for the custom application workflow (e.g., for security reasons, the user only retrieves smaller cash amounts in specific locations).

Generating Custom Workflows

Custom workflows may be generated for some or all transactions between the user and the system. The custom workflow may help capture the user's preferred application workflow, rather than the default application flow, and they may be generated based at least in part on the inference documents discussed above.

Figure 9:
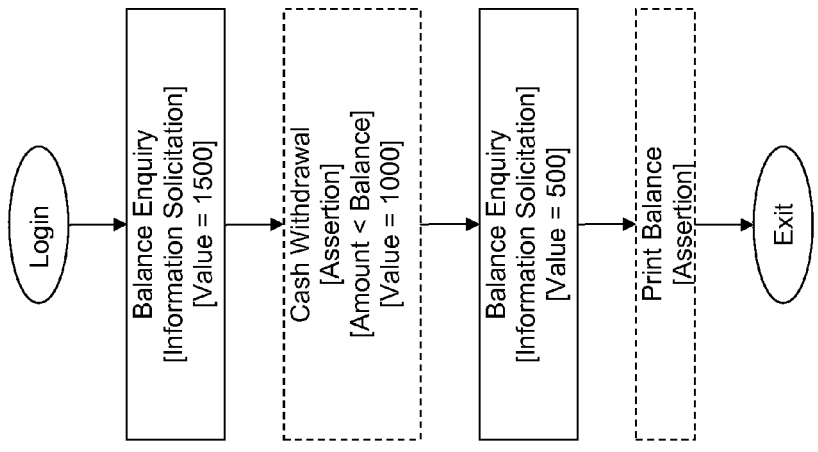
FIGS. 7-9 show how the example ATM workflows may be transformed to filter out mandatory steps, in accordance with certain example embodiments.
Figure 8:
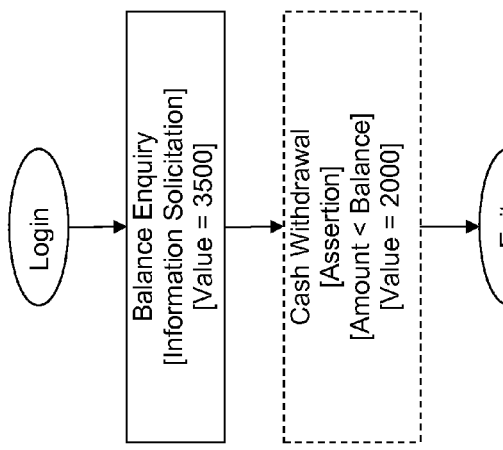
Figure 7:
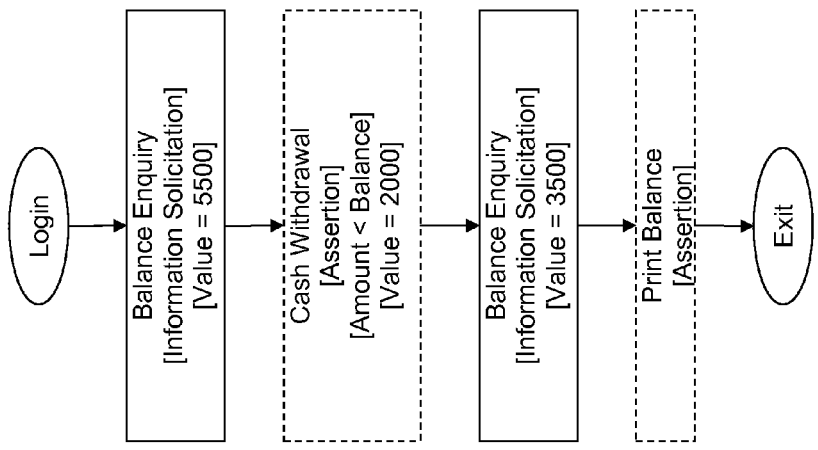

Custom workflow generation may involve filtering out mandatory steps and identifying primary steps. FIGS. 7-9 show how the example ATM workflows may be transformed to filter out mandatory steps, in accordance with certain example embodiments. FIGS. 7-9 are for the 1 Jan. 2013, 11 Jan. 2013, and 21 Jan. 2013 transactions, respectively. Each block represents a step and shows the action type, as well as any relevant values from the decision data set and conditional inferences. As should be apparent from the foregoing, optional steps are excluded from these flows, and the apparent temporal order of events is reflected in the overall organization of the various flows.

In FIGS. 7-9, the blocks with dashed borders are primary steps, or those states in the application workflow where user input is required. It is assumed that the system can automatically perform all the steps that happened prior to the state without user interference, although this is not necessarily required for all embodiments of the invention. Certain example embodiments may identify which steps are primary steps using the following and/or other guidelines:
  Assertions will become primary steps and will remain manual;
  Information Solicitation steps will become part of an action group (discussed in greater detail below) and will become an automatic step; and
  The application developers can also explicitly flag some of the states as mandatory (e.g., Login and Exit in the ATM example).

Figure 12:
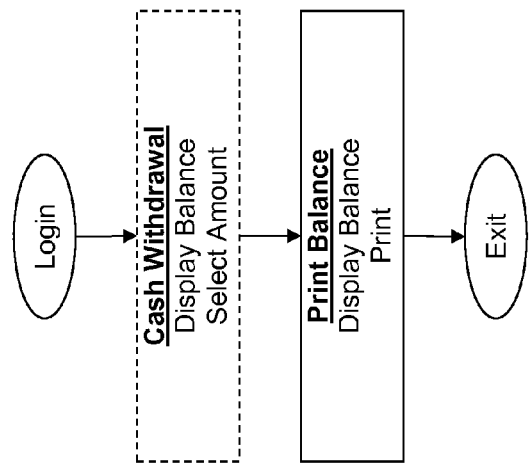
FIG. 10-12 are versions of the workflows from FIGS. 7-9 that have been transformed to reflect action group groupings, in accordance with certain example embodiments.
Figure 11:
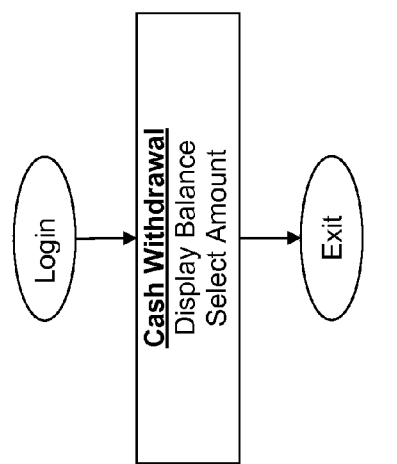
Figure 10:
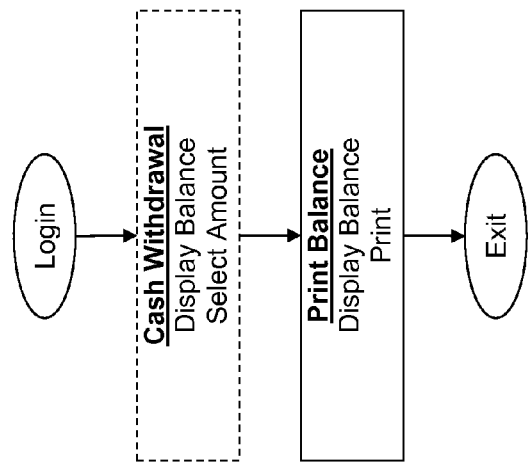

The primary steps may be used to form an action group, with each action group grouping together a primary step and all of the states prior to that primary step. In the above example, Cash Withdrawal will become the first primary step and, thus, all of the steps executed before that will become a subset of the Cash Withdrawal step. The custom workflows shown in FIGS. 7-9 thus will be transformed based on action group groupings, thereby resulting in the flows shown in FIGS. 10-12. These custom workflows may be ranked for generating a user's most preferred workflow.

Ranking Custom Workflows

As indicated above, it is possible in certain example embodiments to rank custom workflows in order to identify a user's most preferred application workflow. This may be performed in certain example embodiments by calculating the execution frequency of each of the states in the custom workflows. Table 6 below shows the ranking for the example transactions discussed above. A ranking may also be performed for the actions/data for a given state itself. For example, Table 7 below ranks the actions in the Cash Withdrawal state.

TABLE 6

Ranking for Example ATM Transactions

| States | Execution Frequency |
| --- | --- |
| Login | 3 |
| Cash Withdrawal | 3 |
| Print Balance | 2 |

TABLE 7

Ranking for Example Cash Withdrawal State

| Event | Value | Execution Frequency |
| --- | --- | --- |
| Select Amount | 2000 | 2 |
| Select Amount | 1000 | 1 |

Figure 13:
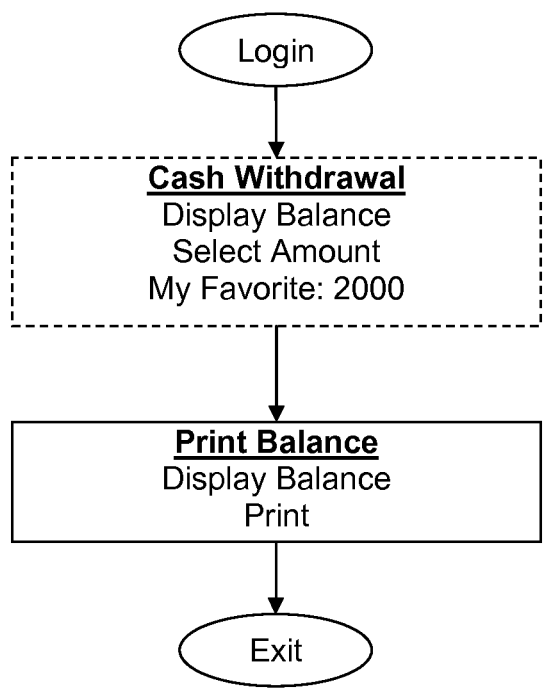
FIG. 13 is a flowchart illustrating the user's preferred workflow, generated using the example techniques set forth herein, for the ATM example.

Based on these rankings, a user's preferred application workflow may be generated. FIG. 13 is a flowchart illustrating the user's preferred workflow, generated using the example techniques set forth herein, for the ATM example. As will be appreciated, the FIG. 13 flowchart is the same as that shown in FIGS. 10 and 12, except that the added intelligence that the favorite withdrawal amount seems to be $2000 is reflected in the user's preferred workflow of FIG. 13.

As alluded to above, a physical location parameter could analogously aid in presenting a most preferred workflow, depending on geographical location. Other parameters may similarly be used.

Annotating the workflows may be performed to help identify users' common workflows Annotated workflows in certain example embodiments can also be presented to the user as favorites and may be accessible wherever the application is used in some instances. For instance, for the ATM example discussed above, annotated workflows may be stored such that these favorites are available to the user from any ATM (and not just the ATM of the bank they bank with), e.g., by being stored on the ATM card or being accessible from a central store when an authenticated session is started.

Different possible annotations for the above transactions may include, for example:
  Cash Withdrawal 2000 With Print Balance [User Preferred workflow]
  Cash Withdrawal 1000 With Print Balance
  Cash Withdrawal With Print Balance A sample execution flow for the Cash Withdrawal 2000 With Print Balance annotation is as follows:
1) Login
  a. [System]: Prompts Authentication
  b. [User]: Enters PIN 2) Cash Withdrawal
 a. [System]: Your Available Balance is $5500
 b. [System]: Withdraw $2000. Confirm?
 c. [User]: Confirms
3) Print Balance
 a. [System]: Your Available Balance is $3500
 b. [System]: Prints the Balance
4) Exit A sample execution flow for the Cash Withdrawal With Print Balance annotation is as follows:
1) Login
 a. [System]: Prompts Authentication
 b. [User]: Enters PIN
2) Cash Withdrawal
 a. [System]: Your Available Balance is $5500
 b. [System]: Select Amount for Withdrawal
 c. [User]: Enters $1000
 d. [System]: Confirm?
 e. [User]: Confirms
3) Print Balance
 a. [System]: Your Available Balance is $4500
 b. [System]: Prints the Balance
4) Exit In addition to generating the user's most preferred workflow, the custom workflow generation and/or primary step identification techniques can be performed over time anonymously and/or in a non-user specific manner to help build a "heat map." The heat map may help to identify details regarding the steps most often used (e.g., revealing user-based critical paths) in the production system. Reports can be generated based on these details and, when provided to the application developers, the reports can help in maintaining applications over multiple versions and also in resolving anomalies. More particularly, heat maps may help to identify narrower hotspots, e.g., to aid in performance-tuning hotspots within a critical path, ensuring performance of the critical paths is at least as good as previous versions (even after changes are made to the system), prioritizing the tests to take advantage of the critical paths collected to help guard against "fixes" causing regressions, etc.

In the ATM example, based on the primary steps identified and the execution frequencies provided above, it may be determined that the steps such as Cash Withdrawal and Print Balance are "hotspots" in the application. These hotspots will be collected, and reported to the application developers.

It will be appreciated that the various documents, workflows, etc., may be stored to a non-transitory computer readable storage medium in certain example embodiments, e.g., to facilitate processing, provide authorized persons (e.g., developers) a chance to review such items prior to proceeding with the next steps (such as, for example, new workflow deployment), etc.

Although certain example embodiments have been described as relating to applying inference techniques to application events, it is noted that the example techniques described herein may be used to take into account system and/or external events in addition to, or in place of, application events. As alluded to above, it may be advantageous to take into account geospatial events (e.g., location information identifying where an interaction is originating from and/or interacting to). Similarly, the collection of device and network level events alone and/or combined with human-to-application interaction sets may be taken into account in certain example embodiments.

As a further example, more user behavior may be taken into account by examining locations where the application is used, the time of day used, the frequency the same user interacts with the system and/or application, the device or device type the user uses to interact with the system, a browser or browser type, etc. For instance, in the ATM interaction scenarios described above, it may be desirable to infer patterns based on the locations of ATM machines used, the time of day used, the frequency the same user interacts with a banking system from a mobile device and/or a web browser, etc. It thus will be appreciated that determining a user's preferred workflow may extend beyond a specific application's context.

The example techniques set forth herein may be use to build a system that can generate an "autobiography" based on the recordings. That is, certain example embodiments can help generate an application autobiography that is, in essence, a form of enhanced and well-formatted logging. These autobiographies can be customized in terms of what content is gathered and how it is processed and subsequently presented based on, for example, the target audience. This also may help to in a way redefine the way logging is performed, e.g., by providing techniques that in certain example instances enable the capturing of a complete or "360 degree" perspective of logging wherein all the aspects (e.g., what, why, how, when, who, etc.) of the log are captured and meaningful content is derived, as opposed to traditional logging where the logs are basically stale content generated out of events. Similarly, in certain example embodiments, the conventional approach of looking at a log as being static content with a predefined formatted structure can be changed, and a more human readable system generated autobiography of the logs can be presented in a template of user's choice.

Although certain example embodiments have been described in connection with Event Driven Applications and, thus, Event Driven Architectures or EDA, it will be appreciated that the example techniques set forth herein are not limited to such applications and/or architectures. For instance, the example techniques associated with the building of inference documents for generating "self-evolving" systems has broader implications and can be used in different types of applications and/or computer architectures. More particularly, although the example embodiments described above discuss instilling self-learning capabilities to Event Driven Application, it will be appreciated that the example techniques described herein may be generalized and applied to any kind of applications and/or systems that could benefit from logging as a means to building application intelligence into such systems and/or inferring intended user's actions by identifying data (that helps in decision-making and/or other tasks) and by generating inference documents for building self-evolving systems.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An application intelligence gathering method for use with an application hosted by a computer system, the method comprising:
   receiving artifacts from a computer readable storage medium, the artifacts representing data gathered during execution of the application according to a default application workflow of the application and relating to events that occur during the execution;
   identifying, using a computer processor, interaction patterns associated with the events based on the received artifacts;
   generating inference documents in connection with the identified interaction patterns using the computer processor, the inference documents including, for each said event, an indication as to whether that event is a mandatory event or an optional event, and one or more reasoned statements concerning the user's intentions for that event, wherein mandatory events have an action that is caused to occur automatically according to the default application workflow and the optional events have an action that is manual in the default application workflow; and
   generating, outside of the application using the computer processor, at least one custom application workflow that is distinct from the default application workflow based on the generated inference documents, wherein the at least one custom application workflow includes events in the generated inference document that are identified as mandatary events, and excludes events in the generated inference document identified as optional events,
   wherein the at least one custom application workflow is transformable into a new application workflow that is deployable into the application, the data gathered during execution of the application is event transition data captured from the application and/or the computer system for each of the events that involves a human-computer interaction, and the data gathered during execution of the application indicates, for each said event, what kind of event was performed, why the event happened, who was responsible for triggering the event, when the event happened, where the event happened, and/or how the event was triggered.

2. The method of claim 1, wherein the event transition data captured is annotated.

3. The method of claim 1, wherein the data gathered during execution of the application specifies whether each captured event was performed based on human input.

4. The method of claim 1, wherein the data gathered during execution of the application specifies one or more application methods associated with each said event.

5. The method of claim 1, wherein the identifying of the interaction patterns associated with the received events includes associating each event with an interaction pattern type selected from the group consisting of assertion, information solicitation, and actionable patterns.

6. The method of claim 1, further comprising generating a decision data set for each said event, the decision data set including data presented to and retrieved from the user in connection with the respective event.

7. The method of claim 6, further comprising, for each said event, determining:
   that the event is a mandatory event when the event is automatic and decision data exists, or when the event is automatic and no decision data exists; and
   that the event is an optional event when the event is manual and no decision data exists.

8. The method of claim 1, wherein the at least one custom application workflow is generated by at least filtering for any mandatory steps and identifying any primary steps, the primary steps being those steps where user input is required and those steps where the system can perform all prior steps without user interference.

9. The method of claim 1, further comprising:
   identifying assertion-type interaction pattern steps as primary steps with manual action types;
   forming one or more action groups, each said action group grouping together one primary step and all steps prior to that primary step that are not themselves primary steps;
   assigning each information solicitation assertion-type interaction pattern step to one said action group as an automatic action type step; and
   generating the at least one custom application workflow in connection with the one or more action groups.

10. The method of claim 9, further comprising receiving input from an authorized party specifying that a particular event is a mandatory event.

11. The method of claim 1, wherein a plurality of custom application workflows is generated, and further comprising ranking the custom application workflows.

12. The method of claim 11, wherein the ranking of the custom application workflows comprises calculating frequencies for each state and/or at least some data values, in connection with each said custom application workflow.

13. The method of claim 12, further comprising generating a user-preferred workflow based on the ranking, the user-preferred workflow including a new arrangement of process steps and/or default data parameters based on prior usage.

14. The method of claim 13, wherein the user-preferred workflow is based on input from a plurality of different users.

15. The method of claim 1, wherein the data gathered during execution of the application is event transition data captured from the application and the computer system, and includes event related data for events from within and external to the application.

16. The method of claim 1, further comprising identifying user-based critical paths in connection with an assessment of which steps are most often used.

17. A non-transitory computer readable storage medium tangible storing instructions that, when performed, gather application intelligence on an application hosted by a computer system, by executing instructions to at least:
   receive artifacts from a computer readable storage medium, the artifacts representing data gathered during execution of the application according to a default application workflow of the application and relating to events that occur during the execution;
   identify interaction patterns associated with the events based on the received artifacts;
   generate inference documents in connection with the identified interaction patterns, the inference documents including, for each said event, an indication as to whether that event is a mandatory event or an optional event, and one or more reasoned statements concerning the user's intentions for that event, wherein mandatory events have an action that is caused to occur automatically according to the default application workflow and the optional events have an action that is manual in the default application workflow; and generate, outside of the application, at least one custom application workflow that is distinct from the default application workflow based on the generated inference documents, the at least one custom application workflow including events in the generated inference document that are identified as mandatary events, and excludes events in the generated inference document identified as optional events, wherein the at least one custom application workflow is transformable into a new application workflow that is deployable into the application, the data gathered during execution of the application is event transition data captured from the application and/or the computer system for each of the events that involves a human-computer interaction, and the data gathered during execution of the application indicates, for each said event, what kind of event was performed, why the event happened, who was responsible for triggering the event, when the event happened, where the event happened, and/or how the event was triggered.

18. A computer system for gathering application intelligence on an application, comprising:

processing resources including at least one processor and a memory; and a computer readable storage medium tangibly storing data gathered during execution of the application according to a default application workflow of the application and relating to events that occur during the execution;

wherein at least some of the processing resources are configured to at least:

identify interaction patterns associated with the events based on the received artifacts, using the computer readable storage medium;

generate inference documents in connection with the identified interaction patterns, the inference documents including, for each said event, an indication as to whether that event is a mandatory event or an optional event, and one or more reasoned statements concerning the user's intentions for that event, wherein mandatory events have an action that is caused to occur automatically according to the default application workflow and the optional events have an action that is manual in the default application workflow; and generate, outside of the application, at least one custom application workflow that is distinct from the default application workflow based on the generated inference documents; wherein the at least one custom application workflow includes events in the generated inference document that are identified as mandatary events and excludes events in the generated inference document identified as optional events;

wherein the at least one custom application workflow is transformable into a new application workflow that is deployable into the application; and wherein the data gathered during execution of the application is event transition data captured from the application and/or the computer system for each of the events that involves a human-computer interaction, and the data gathered during execution of the application indicates, for each said event, what kind of event was performed, why the event happened, who was responsible for triggering the event, when the event happened, where the event happened, and/or how the event was triggered, as appropriate for the respective event.

19. The system of claim 18, wherein the identifying of the interaction patterns associated with the events includes associating each event with an interaction pattern type selected from the group consisting of assertion, information solicitation, and actionable patterns.

20. The system of claim 18, wherein at least some of the processing resources are configured to at least generate a decision data set for each said event, the decision data set including data presented to and retrieved from the user in connection with the respective event.

21. The system of claim 20, wherein at least some of the processing resources are further configured to at least, for each event determine:

that the event is a mandatory event when the event has an automatic action and decision data exists, or when the event has an automatic action and no decision data exists; and that the event is an optional event when the event has a manual action and no decision data exists.

22. The system of claim 18, wherein the at least one custom application workflow is generated in connection with at least some of the processing resources filtering for any mandatory steps and identifying any primary steps, the primary steps being those steps where user input is required and those steps where the system can perform all prior steps without user interference.

23. The system of claim 22, wherein at least some of the processing resources are further configured to at least:

identify assertion-type interaction pattern steps as primary steps with manual action types;

form one or more action groups, each said action group grouping together one primary step and all steps prior to that primary step that are not themselves primary steps;

assign each information solicitation assertion-type interaction pattern step to one said action group as an automatic action type step; and generate the at least one custom application workflow in connection with the one or more action groups.

24. The system of claim 18, wherein at least some of the processing resources are further configured to generate a plurality of custom application workflows based on the generated inference documents, and when a given custom application workflows is generated a predetermined number of times, the given custom application workflow is deployed into the application.

25. The system of claim 18, wherein at least some of the processing resources are further configured to at least generate decision data for each said event, the decision data including data presented to and retrieved from the user in connection with the respective event, and wherein the one or more reasoned statements concerning the user's intentions for each event is generated based on the decision data of the respective event.

26. The method of claim 1, wherein the new application workflow is deployable into the application along with the default application to provide a distinct alternative workflow to the default application workflow provided in the application.

* * * * *